(12) United States Patent
Abe

(10) Patent No.: US 8,819,054 B2
(45) Date of Patent: Aug. 26, 2014

(54) INFORMATION PROCESSING APPARATUS, METHOD FOR PROCESSING INFORMATION, AND STORAGE MEDIUM

(75) Inventor: Ken-ichi Abe, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 123 days.

(21) Appl. No.: 12/763,931

(22) Filed: Apr. 20, 2010

(65) Prior Publication Data

US 2010/0274802 A1 Oct. 28, 2010

(30) Foreign Application Priority Data

Apr. 23, 2009 (JP) ................................ 2009-105496

(51) Int. Cl.
*G06F 17/30* (2006.01)
(52) U.S. Cl.
USPC .......................................... 707/769; 707/736
(58) Field of Classification Search
None
See application file for complete search history.

(56) References Cited

U.S. PATENT DOCUMENTS

| | | | | |
|---|---|---|---|---|
| 4,805,119 A * | 2/1989 | Maeda et al. | ................. | 715/748 |
| 5,448,696 A * | 9/1995 | Shimada et al. | ............. | 715/853 |
| 5,715,444 A * | 2/1998 | Danish et al. | .......... | 707/999.004 |
| 5,977,972 A * | 11/1999 | Bates et al. | .................... | 715/786 |
| 5,983,219 A * | 11/1999 | Danish et al. | .......... | 707/999.003 |
| 6,275,806 B1 * | 8/2001 | Pertrushin | ..................... | 704/272 |
| 7,035,873 B2 * | 4/2006 | Weare | .................... | 709/999.003 |
| 7,089,505 B2 * | 8/2006 | Nagahara et al. | ............. | 715/848 |
| 7,325,201 B2 * | 1/2008 | Ferrari et al. | ................. | 715/737 |
| 7,596,581 B2 * | 9/2009 | Frank et al. | ............ | 707/999.101 |
| 7,752,573 B2 * | 7/2010 | Shiba et al. | .................... | 715/835 |
| 2003/0214538 A1 * | 11/2003 | Farrington et al. | ........... | 345/854 |
| 2005/0022114 A1 * | 1/2005 | Shanahan et al. | ............. | 715/513 |
| 2005/0071329 A1 * | 3/2005 | Weare | ............................. | 707/3 |
| 2006/0282789 A1 * | 12/2006 | Kim | ............................... | 715/764 |

FOREIGN PATENT DOCUMENTS

| | | |
|---|---|---|
| JP | 2005-208838 A | 8/2005 |
| JP | 2006-350847 A | 12/2006 |

* cited by examiner

*Primary Examiner* — Sherief Badawi
*Assistant Examiner* — Jacques Veillard
(74) *Attorney, Agent, or Firm* — Canon USA, Inc., IP Division

(57) ABSTRACT

There is provided a method including acquiring content distribution information with respect to a criterion denoted by an attribute of metadata supplied to the content, determining as an option, of a plurality of options, a candidate of a search condition to be added as a query related to the attribute, based on the distribution information, displaying a screen including the attribute and the option, and retrieving content from the candidate displayed in the displaying step based on an attribute value corresponding to an option of the plurality of options selected by a user.

11 Claims, 23 Drawing Sheets

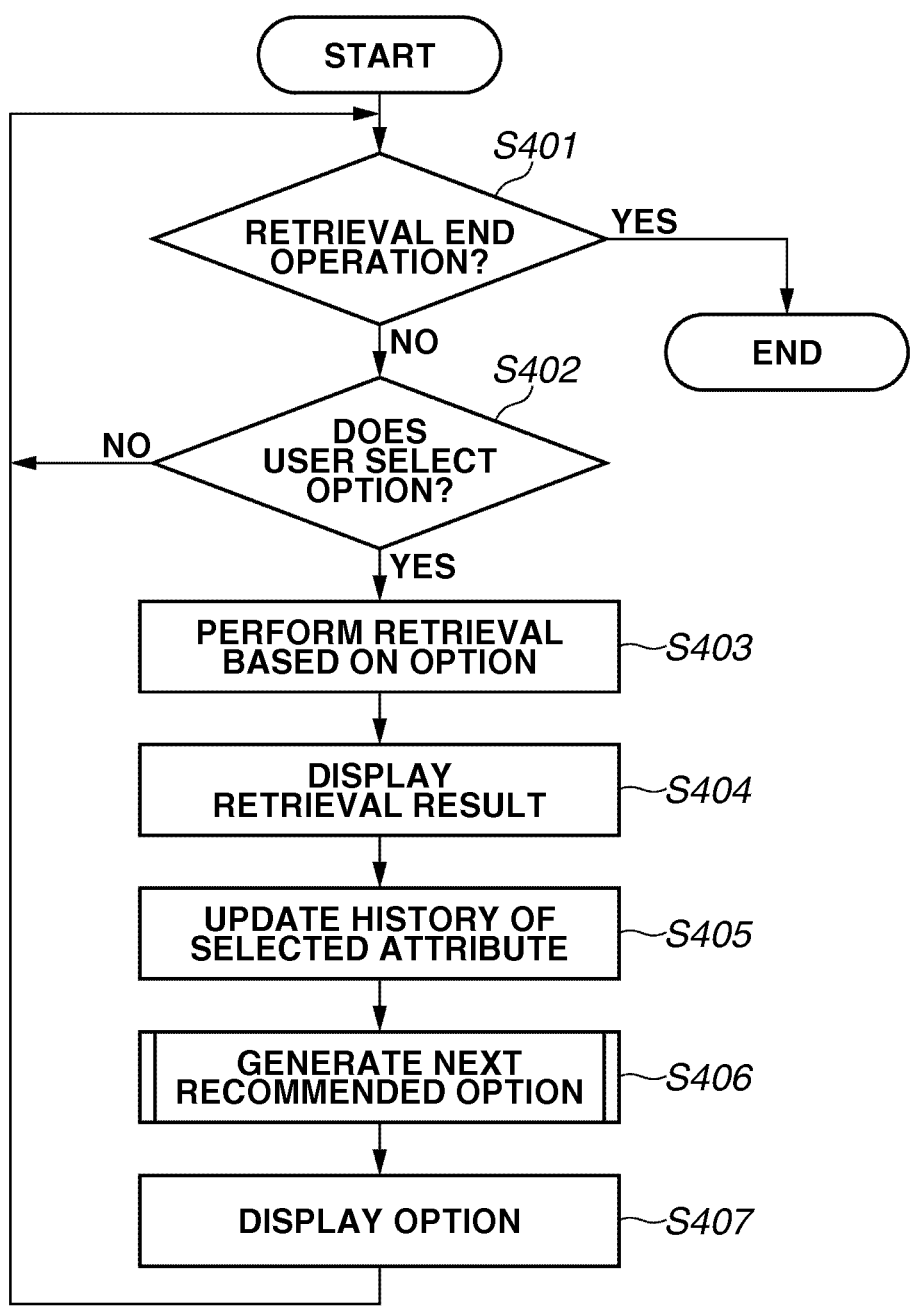

FIG.5

CONFIGURATION OF ATTRIBUTE TRANSITION PROBABILITY TABLE

| | SUBJECT | PHOTOGRAPHING LOCATION | PHOTOGRAPHING DATE | PHOTOGRAPHER |
|---|---|---|---|---|
| SUBJECT | | 5 | 10 | 1 |
| PHOTOGRAPHING LOCATION | 3 | | 4 | 2 |
| PHOTOGRAPHING DATE | 1 | 0 | | 5 |
| PHOTOGRAPHER | 7 | 4 | 2 | |

FREQUENCY AT WHICH ATTRIBUTE OF EACH COLUMN (TOP) IS SELECTED IMMEDIATELY FOLLOWING ATTRIBUTE OF EACH ROW (LEFT) IS STORED AS PROBABILITY OF TRANSITION BETWEEN ATTRIBUTES.

FIG.10

EXAMPLE OF UNIFORMITY CALCULATION $$\text{UNIFORMITY: } S = \frac{1}{V} \quad (V: \text{VARIANCE})$$

$$V = \frac{1}{n} \sum_{k=1}^{n} (X_k - \overline{X})^2$$

n: NUMBER OF CONTENTS
$X_k$: NUMBER OF CONTENTS ON TIME AXIS
$\overline{X}$: AVERAGE NUMBER OF CONTENTS

EXAMPLE OF OPTIONS CORE CALCULATION

Dp: DISTANCE BETWEEN OPTION BOUNDARY CLOSEST TO PEAK POSITION AND PEAK POSITION

Db: DISTANCE BETWEEN OPTION BOUNDARY CLOSEST TO BOTTOM POSITION AND BOTTOM POSITION

EXEMPLARY HIERARCHICAL STRUCTURE OF
OPTIONS HAVING HIERARCHICAL STRUCTURE
(PHOTOGRAPHING LOCATION)

EXEMPLARY DISPLAY OF OPTIONS HAVING HIERARCHICAL STRUCTURE (PHOTOGRAPHING LOCATION)

FIG.18

| DOCUMENT ID | PHOTOGRAPHING DATE | PHOTOGRAPHING LOCATION | SUBJECT | ... |
|---|---|---|---|---|
| 1 | 2002 | TOKYO | YAMADA | ... |
| 2 | 2005 | ZAO | YAMADA, NAKAMURA | ... |
| 3 | 2008 | HAWAII | SATO | ... |
| ... | ... | ... | ... | ... |

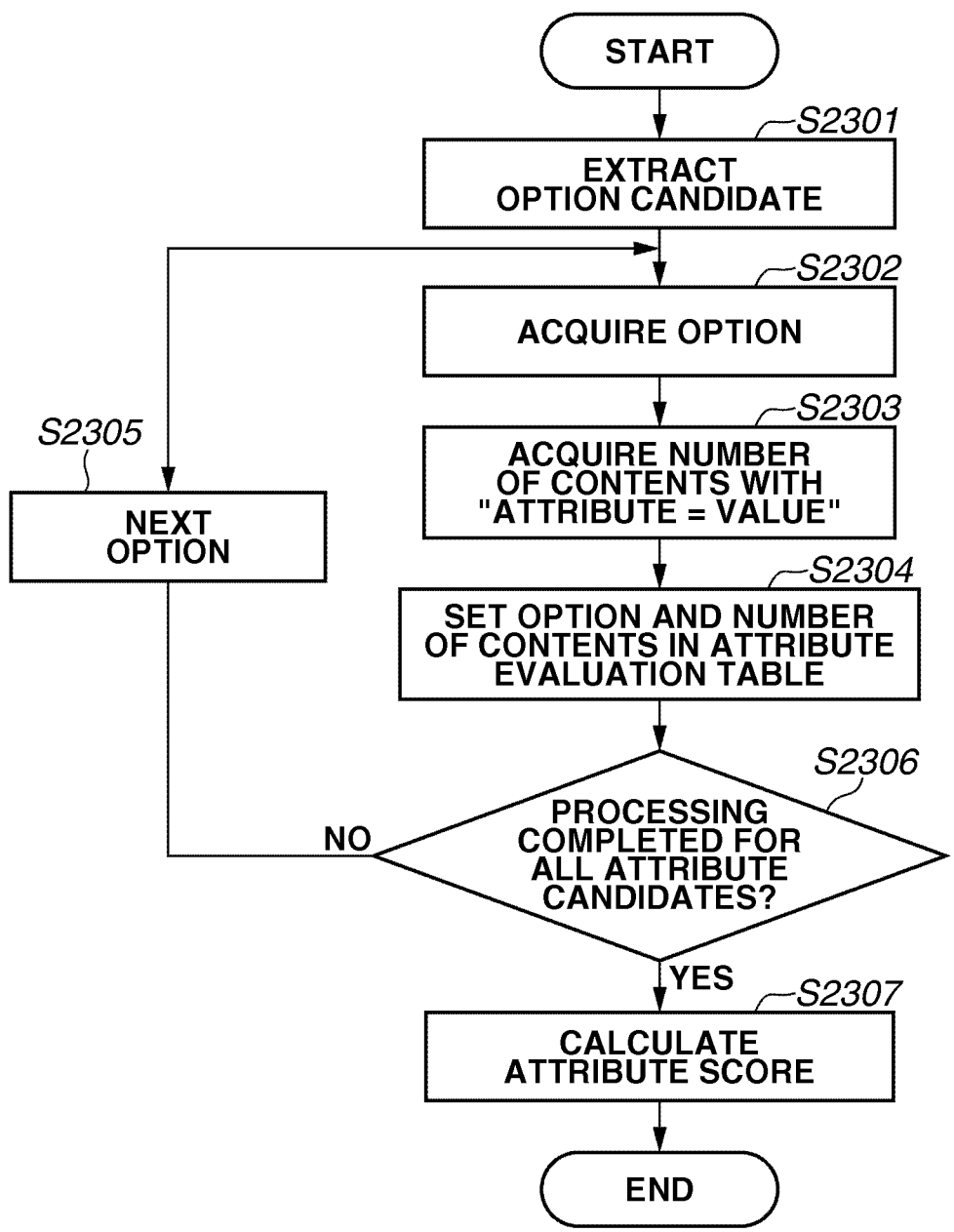

INFORMATION PROCESSING APPARATUS, METHOD FOR PROCESSING INFORMATION, AND STORAGE MEDIUM

BACKGROUND OF THE INVENTION

1. Field of the Invention

The present invention relates to an information processing apparatus, a method for processing information, and a storage medium.

2. Description of the Related Art

Many conventional information retrieval systems retrieve content which coincides with a user-input keyword. With conventional systems, although a retrieval result can be quickly obtained as long as the user inputs a correct keyword, the user needs to consider a new keyword for each retrieval. Further, there has been a problem that it is difficult for general non-expert users to input a correct keyword.

To solve this problem, a method of label-based retrieval is discussed. With this method, metadata supplied to contents is presented to the user as options and retrieval refinement is performed based on the option selected by the user.

With a technique discussed in Japanese Patent Application Laid-Open No. 2005-208838, suitability of an attribute value included in retrieved contents as a label is obtained, and the attribute values are presented to a user in order of suitability, i.e., starting from an attribute value having the highest suitability. When the user selects a label, retrieval is performed in the contents including the label.

However, since the technique discussed in Japanese Patent Application Laid-Open No. 2005-208838 utilizes fixed options prepared in advance and one piece of content extraction information for each attribute, there has been a case where an option which has almost no refinement effect for a certain attribute is presented to the user. Therefore, in selective retrieval, there has been room for improvement in usability of options until the user acquires a desired retrieval result.

SUMMARY OF THE INVENTION

According to an aspect of the present invention, an information processing apparatus which retrieves a target content from a storage apparatus storing a plurality of contents includes an acquisition unit configured to acquire content distribution information with respect to a criterion denoted by an attribute of metadata supplied to the content, a determination unit configured to determine, as an option of a plurality of options, a candidate of a search condition to be added as a query related to the attribute, based on the distribution information, a display unit configured to display a screen which includes the attribute and the option determined by the determination unit, and a retrieval unit configured to retrieve content from the candidate displayed by the display unit based on an attribute value corresponding to an option of the plurality of options selected by a user.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a flow chart illustrating retrieval processing.

FIG. 5 illustrates an exemplary configuration of an attribute transition table updated in step S405 in FIG. 4.

FIG. 10 illustrates an example of uniformity calculation.

FIG. 18 illustrates a table for registering metadata.

FIG. 23 is a flow chart illustrating processing for determining an attribute.

DESCRIPTION OF THE EMBODIMENTS

Various exemplary embodiments, features, and aspects of the invention will be described in detail below with reference to the drawings.

Figure 1:
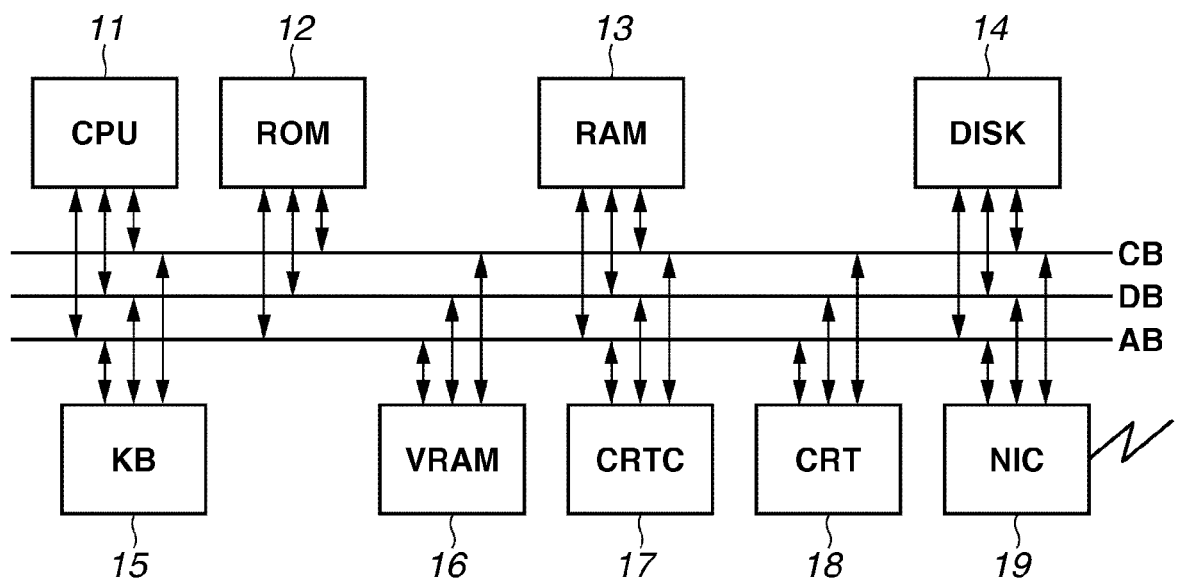
FIG. 1 illustrates a hardware configuration of an information retrieval apparatus.

FIG. 1 illustrates a hardware configuration of an information retrieval apparatus according to the present invention.

As illustrated in FIG. 1, an information retrieval apparatus 100 includes a microprocessor (central processing unit (CPU)) 11 which controls each component of the information retrieval apparatus 100 and at the same time performs calculations and logical determination for content retrieval. A read-only memory (ROM) 12 is a fixed memory for storing control program codes such as processing programs to be executed by the CPU 11. A random access memory (RAM) 13 is a rewritable memory for temporarily storing various types of data transmitted from each component. A disk 14 is an external memory for storing program codes which perform content retrieval processing (described below). The disk 14 may be an internal memory such as a hard disk.

A keyboard (KB) 15 includes various function keys such as alphanumeric keys, symbol input keys, and cursor movement keys. A video RAM (VRAM) 16 is a display video memory for storing display patterns of data to be displayed. A cathode-ray tube (CRT) 18 is a display unit for displaying the contents stored in the VRAM 16 based on control of a CRT controller (CRTC) 17. The CRT 18 may be a cathode-ray tube or liquid crystal panel for displaying dot patterns and cursors. A network interface controller (NIC) 19 serves to connect the information retrieval apparatus 100 to a network such as Ethernet (registered trademark). These components are mutually connected via an address bus AB, a control bus CB, and a data bus DB.

The address bus AB transfers an address signal for designating components to be controlled by the CPU 11. The control bus CB transfers a control signal from the CPU 11 to each component under control of the CPU 11. The data bus DB transfers data between these components.

The information retrieval apparatus 100 operates according to various commands input from the KB 15 as well as those supplied from the network via the NIC 19. When an input is supplied from the KB 15 or NIC 19, an interruption signal is transmitted to the CPU 11 first. Then, the CPU 11 reads control signals (programs) from the disk 14 and performs control according to these control signals to implement processing illustrated in flow charts described below.

In the present exemplary embodiment, a database or contents database table described below may be stored in the ROM 12, RAM 13, or disk 14 of the information retrieval apparatus 100, or in an external storage apparatus connected via the network.

Figure 15:
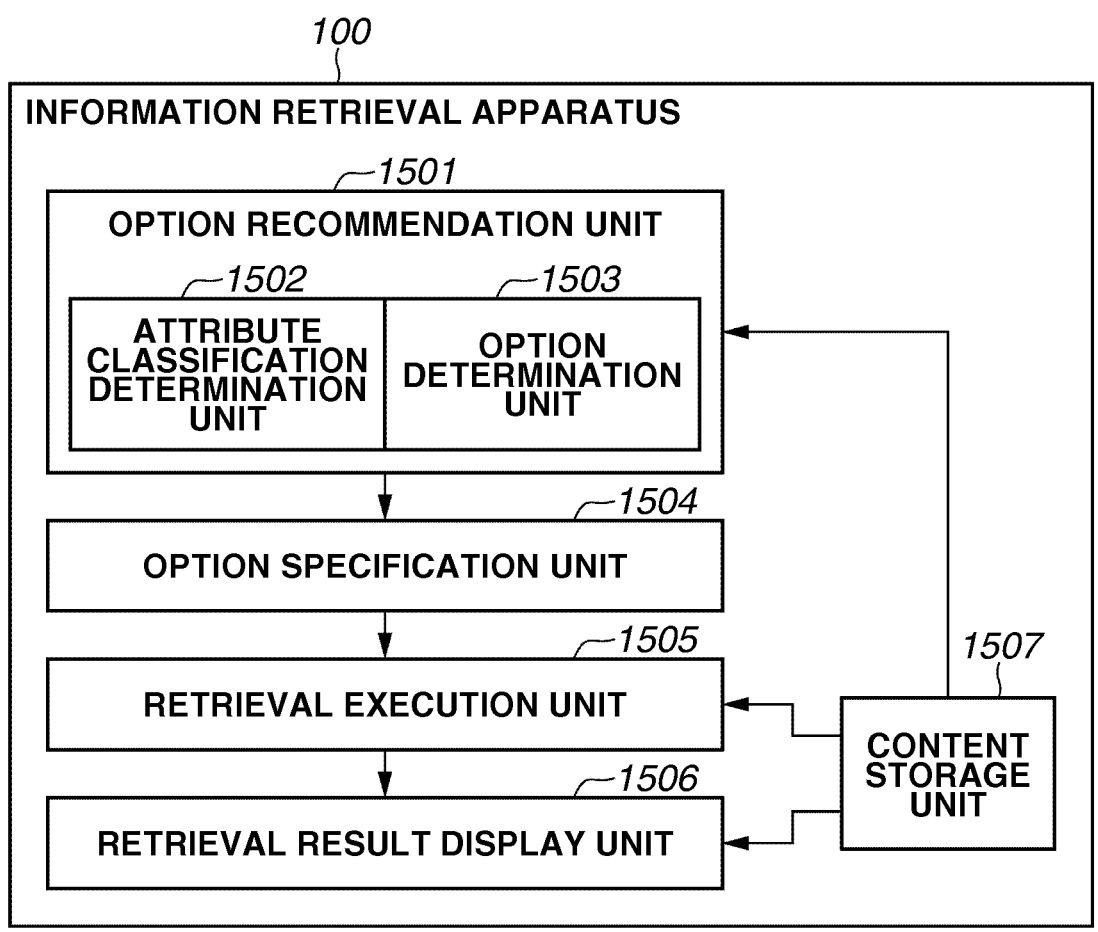
FIG. 15 is a schematic block diagram of functions of the information retrieval apparatus.

FIG. 15 is a functional block diagram of the information processing apparatus 100. An option recommendation unit 1501 recommends an option which allows a user to easily perform retrieval refinement. An attribute classification determination unit 1502 selects an attribute which can produce the greatest refinement effect from among a plurality of recommended attribute candidates using content distribution obtained from a retrieval history or a content storage unit 1507. An option determination unit 1503 determines a range of options to be displayed based on content distribution for a certain attribute obtained from the content storage unit 1507. An option specification unit 1504 issues a retrieval query based on an option selected by the user. A retrieval execution unit 1505 retrieves a content satisfying the retrieval query in the content storage unit 1507. A retrieval result display unit 1506 acquires the content satisfying the retrieval performed by the retrieval execution unit 1505 from the content storage unit 1507 and then displays it.

Figure 2:
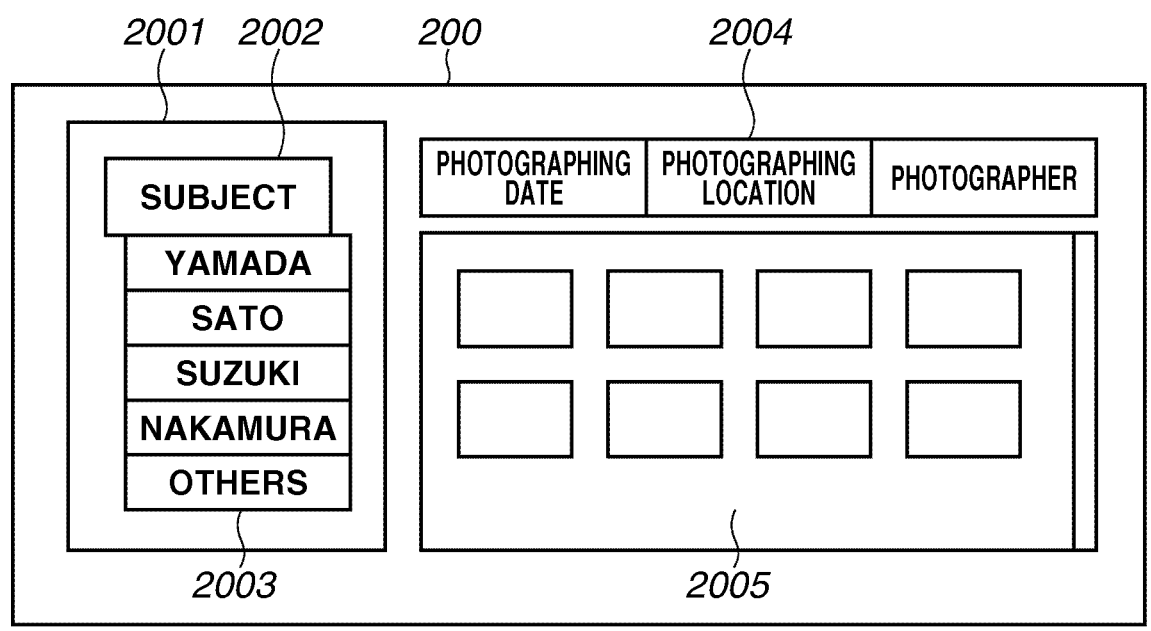
FIG. 2 illustrates a retrieval screen.

FIG. 2 illustrates an example of a retrieval screen displayed at the time of retrieval processing by the information processing apparatus 100. When the user instructs the database to perform retrieval, the information retrieval apparatus 100 displays a retrieval screen 200 on the CRT 18. Contents include texts, still images, video images, and combinations thereof. An option display area 2001 displays options most recommended for a set of retrieval target contents. The option display area 2001 includes an option attribute classification 2002.

Referring to FIG. 2, the information processing apparatus 100 acquires an attribute classification "Subject" and an attribute value "Yamada" from metadata (Subject=Yamada) supplied to a content, and displays a list of attribute values included in a retrieval target document as options "Yamada", "Sato", "Suzuki", "Nakamura", and "Others." Each item (attribute value) included in an option is a refinement condition, and retrieval is performed based on a selected option. For example, when "Yamada" is selected by the user, the information retrieval apparatus 100 adds "Subject=Yamada" to the search condition, and retrieves in the database an image supplied with metadata "Subject=Yamada" and outputs it.

The retrieval screen 200 includes an attribute classification selection area 2004. FIG. 2 illustrates an example of an initial screen which displays attribute values related to "Subject", one of the attribute classification. The CPU 11 generates options according to the distribution of the retrieval target content from among a plurality of option candidates. Then, the CPU 11 preferentially presents the user with highly reliable options which enables suitable retrieval refinement from among options related to attribute classifications which are not selected by the user. This processing will be described in detail below. Referring to FIG. 2, the user can also select an attribute classification other than "Subject" from the attribute classification selection area 2004. When the CPU 11 detects that the user has selected the attribute classification in the attribute classification selection area 2004, the CPU 11 displays in the option display area 2001 typical attribute values of the selected attribute classification as options. Then, the user can select a desired option for refining the search condition to perform retrieval. The retrieval screen 200 includes a retrieval result display area 2005 for displaying a retrieval result. Each time a search condition is added by the information processing apparatus 100, the retrieval result display area 2005 updates and displays the result of retrieval performed with the added search condition.

Figure 3:
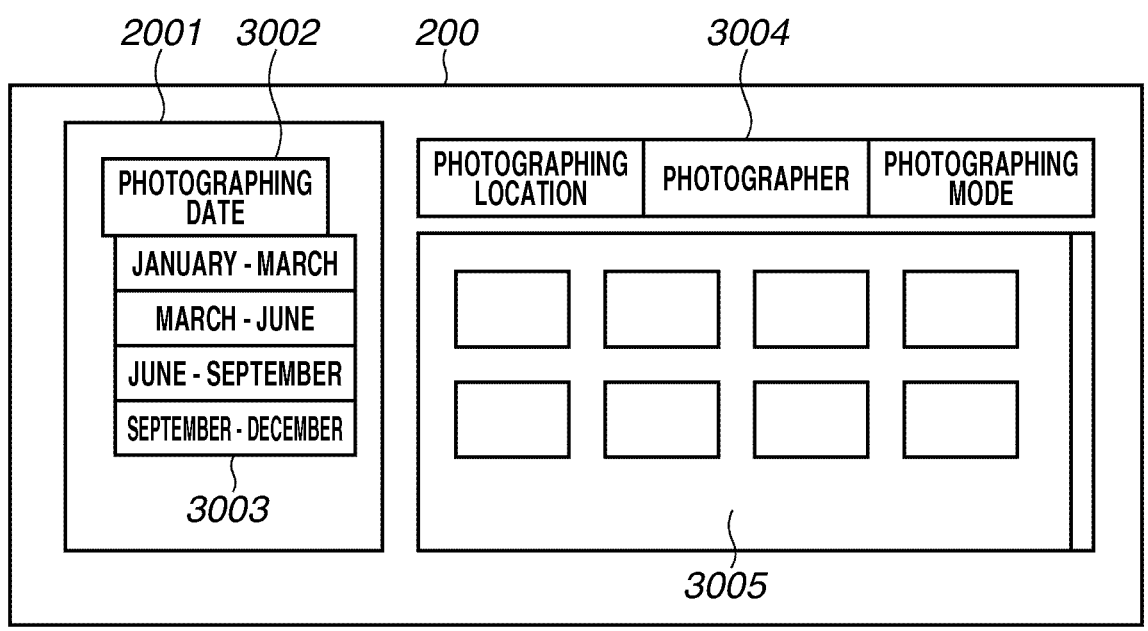
FIG. 3 illustrates a screen displayed when "Yamada" is selected in the retrieval screen in FIG. 2.

FIG. 3 illustrates the retrieval screen 200 displayed immediately after "Yamada" is selected in the screen in FIG. 2. When "Yamada" is selected, retrieval is performed with a search condition "Subject=Yamada", and contents supplied with metadata "Subject=Yamada" are displayed in the retrieval result display area 2005. In response to the retrieval result displayed in the retrieval result display area 2005, the option display area 2001 displays options which have the high refinement reliability next to the options in the attribute classification "Subject." More specifically, the option display area 2001 displays an attribute classification "Photographing date", and relevant options "January-March", "March-June", "June-September", and "September-December."

FIG. 4 illustrates retrieval processing performed by the CPU 11 of the information retrieval apparatus 100. In step S401, the CPU 11 checks whether the user has performed a retrieval end operation. When the user has performed the retrieval end operation (YES in step S401), the CPU 11 terminates retrieval. On the other hand, when the user has not performed the retrieval end operation (NO in step S401), the CPU advances the processing to step S402 to determine whether the user has selected an option via the retrieval screen 200. When the CPU 11 determines that a selection event has occurred (YES in S402), the CPU 11 performs retrieval. On the other hand, when the CPU 11 determines that a selection event has not occurred (NO in step S402), the processing returns to step S401. The selection event is such an event that occurs when selection of the option by the user is detected.

In step S403, the CPU 11 performs retrieval refinement based on an option (attribute value corresponding thereto) selected by the user via the retrieval screen 200. The CPU 11 retrieves a content which includes the attribute value selected as the search condition with reference to a table (metadata—content ID list) indicating a relation between the content ID and metadata registered in the database as illustrated in FIG. 18.

In step S404, the CPU 11 displays again an obtained retrieval result in the retrieval result display area 3005 in FIG. 3. In step S405, the CPU 11 performs processing for updating history of the selected attribute to reflect the present selection operation to an attribute transition probability table for recording the history of selection between attributes as described in detail in FIG. 5. In step S406, the CPU 11 generates an option which has high refinement reliability among options related to the attribute classifications not selected by the user, and presents the generated option to the user.

In step S407, the CPU 11 displays (presents) the option generated in step S406 and a relevant attribute label in the option display area 2001 in FIG. 3. This completes one retrieval refinement and the CPU 11 waits for the next event.

FIG. 5 illustrates a configuration example of the attribute transition table updated in step S405 in FIG. 4. Each time the user selects an option, the transition history of the attribute including the selected option is stored in the attribute transition table. A frequency that an option included in the attribute 502 of each column is selected immediately following the attribute 501 of each row is stored in as the frequency 503. For example, the frequency 503 in FIG. 5 indicates that the attribute "Photographing date" is selected immediately following the attribute "Subject" 10 times. When the attribute "Photographing date" is selected again immediately following the attribute "Subject" in step S405, the frequency 503 will be incremented to 11.

Figure 6:
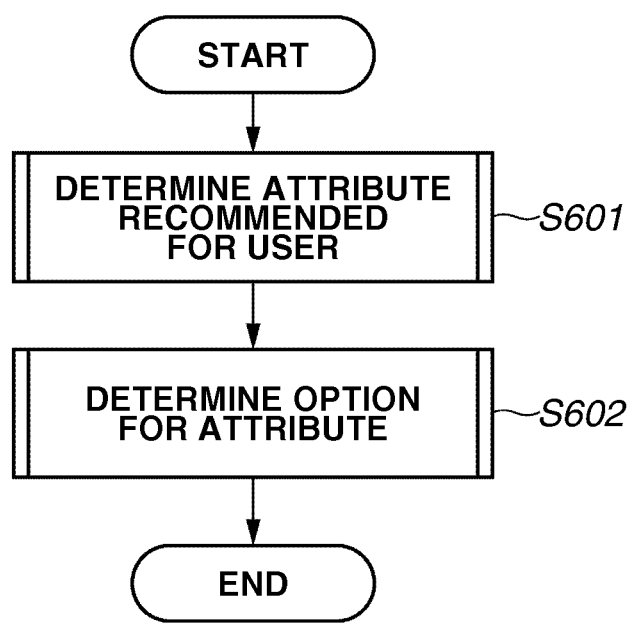
FIG. 6 is a flow chart illustrating detailed processing for generating options in step S406 in FIG. 4.

FIG. 6 is a flow chart illustrating detailed processing for generating options in step S406 in FIG. 4. In step S601, the CPU 11 determines which attribute is efficient as a refinement condition (determination of attribute), and displays the determined attribute in the option display area 2001 in FIG. 3 as a recommended attribute. This processing will be described in detail below with reference to FIG. 7. In step S602, the CPU 11 determines which options are to be displayed for the recommended attribute displayed in the option display area 2001 in FIG. 3 (determination of option). This processing will be described in detail below with reference to FIGS. 8 and 9.

Figure 7:
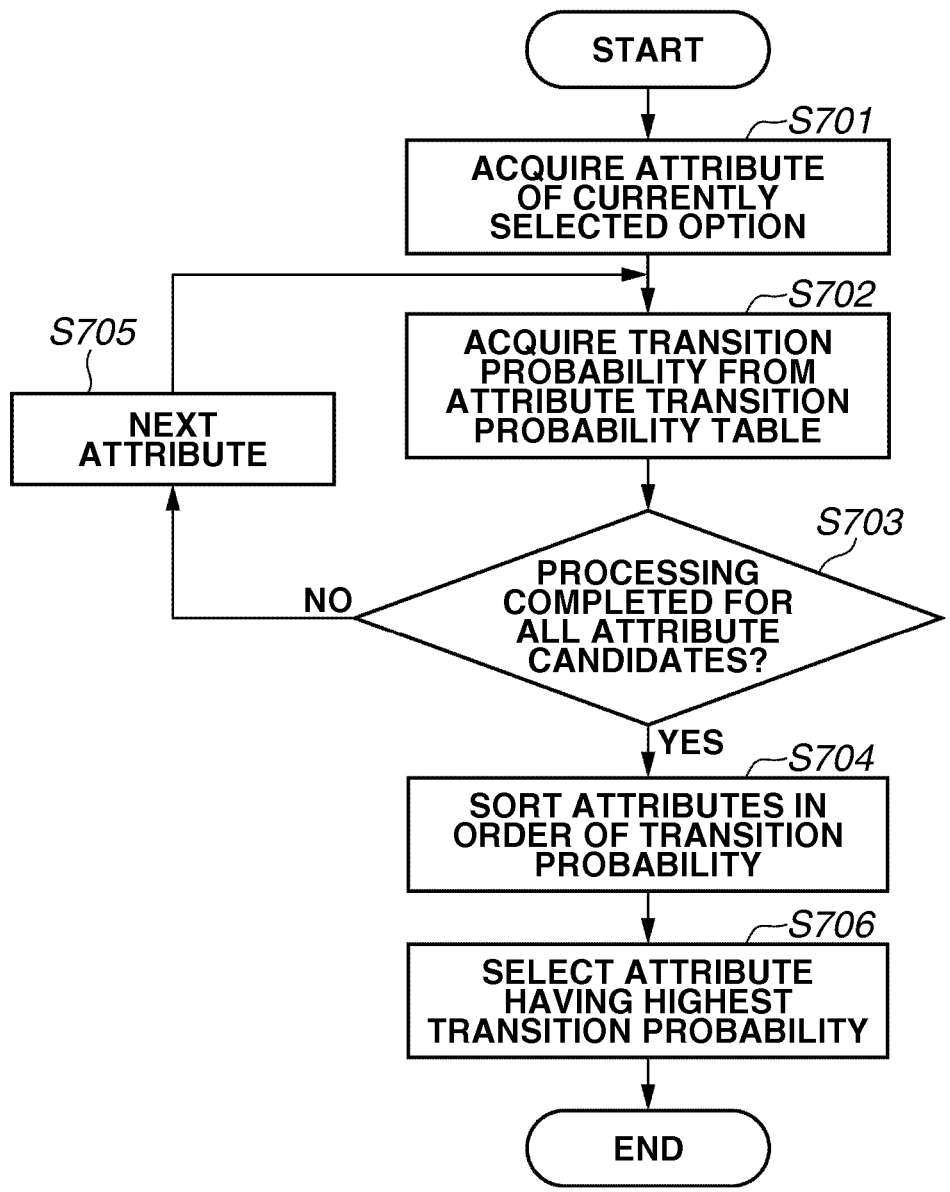
FIG. 7 is a flow chart illustrating detailed processing for determining an attribute in step S601 in FIG. 6.

FIG. 7 is a flow chart illustrating detailed processing for determining an attribute to be recommended to the user in step S601 in FIG. 6. In step S701, the CPU 11 acquires an attribute including the currently selected option. It is supposed that the CPU 11 acquires the attribute "Subject" currently selected as illustrated in FIG. 2. In step S702, the CPU 11 acquires the transition probability from the attribute transition probability table in FIG. 5. In step S703, the CPU 11 determines whether the transition probability has been acquired for all attribute candidates. When the transition probability has been acquired for all attribute candidates (YES in step S703), the CPU advances the processing to step S704. On the other hand, when the transition probability has not yet been acquired for all attribute candidates (NO in step S703), the CPU 11 advances the processing to step S705. In step S704, the CPU 11 sorts all the attributes acquired in S702 in order of transition probability, and selects an attribute which has the highest transition probability as the next recommended attribute. Referring to FIG. 5, the transition probability of the attribute row "Subject" is 5 for "Photographing location", 10 for "Photographing date", and 1 for "Photographer." Therefore, as illustrated in FIG. 3, "Photographing date" which has the highest transition probability is selected as a recommended option to be presented immediately following an option selection for the attribute "Subject" in FIG. 2.

An example of the processing for determining options in step S602 in FIG. 6 will be described in detail with reference to FIG. 8. The present exemplary embodiment will be described using an example where options are determined for the attribute "Photographing date." From among a plurality of option candidates within a predetermined range, the CPU 11 dynamically determines options to be displayed based on the document distribution included therein.

A time axis 801 denotes the clock time of one day. A document distribution 802 denotes distribution information about the retrieval target contents mapped on the time axis 801 assigned the attribute "Photographing date." A length of bar denotes the number of retrieval target contents on the time axis.

Option candidates 803 denote candidates of options for the attribute classification "Photographing date." The option candidates are set in advance such that they have different boundaries and stored in the RAM 13, disk 14, or database. The option candidates 1 include six options "6:00-9:00", "9:00-12:00", "12:00-15:00", "15:00-18:00", and "18:00-21:00." The option candidates 2 include six options "5:00-8:00", "8:00-11:00", "11:00-14:00", "14:00-17:00", and "17:00-20:00." The option candidates 3 include four options "Morning", "Daytime", "Evening", and "Night." A time range for each selection item of the option candidate 3 is "Morning (5:00-10:30)", "Daytime (10:00-15:30)", "Evening (15:00-18:30)", and "Night (18:00-23:30)." Ranges of options may overlap with each other. Further, although only three option candidates are used for explanation, many option candidates having different ranges, such as "Forenoon", "Afternoon", "Morning", "Daytime", "Night", "Midnight", etc., may be prepared for the same attribute.

When options of an attribute classification which includes a continuous attribute value such as date are determined, the CPU 11 takes notice of peaks of the distribution of the number of contents. The CPU 11 preferentially recognizes an option candidate which has option boundaries not overlapping with any peak of the document distribution as an option for the attribute "Photographing date." Referring to FIG. 8, the document distribution 802 reaches a peak around 9:00 and 18:00. Therefore, from among the option candidates 1, 2, and 3, the option candidate 3 which has option boundaries not overlapping with any peak of the document distribution most is selected as the option for the attribute "Photographing date."

Figure 8:
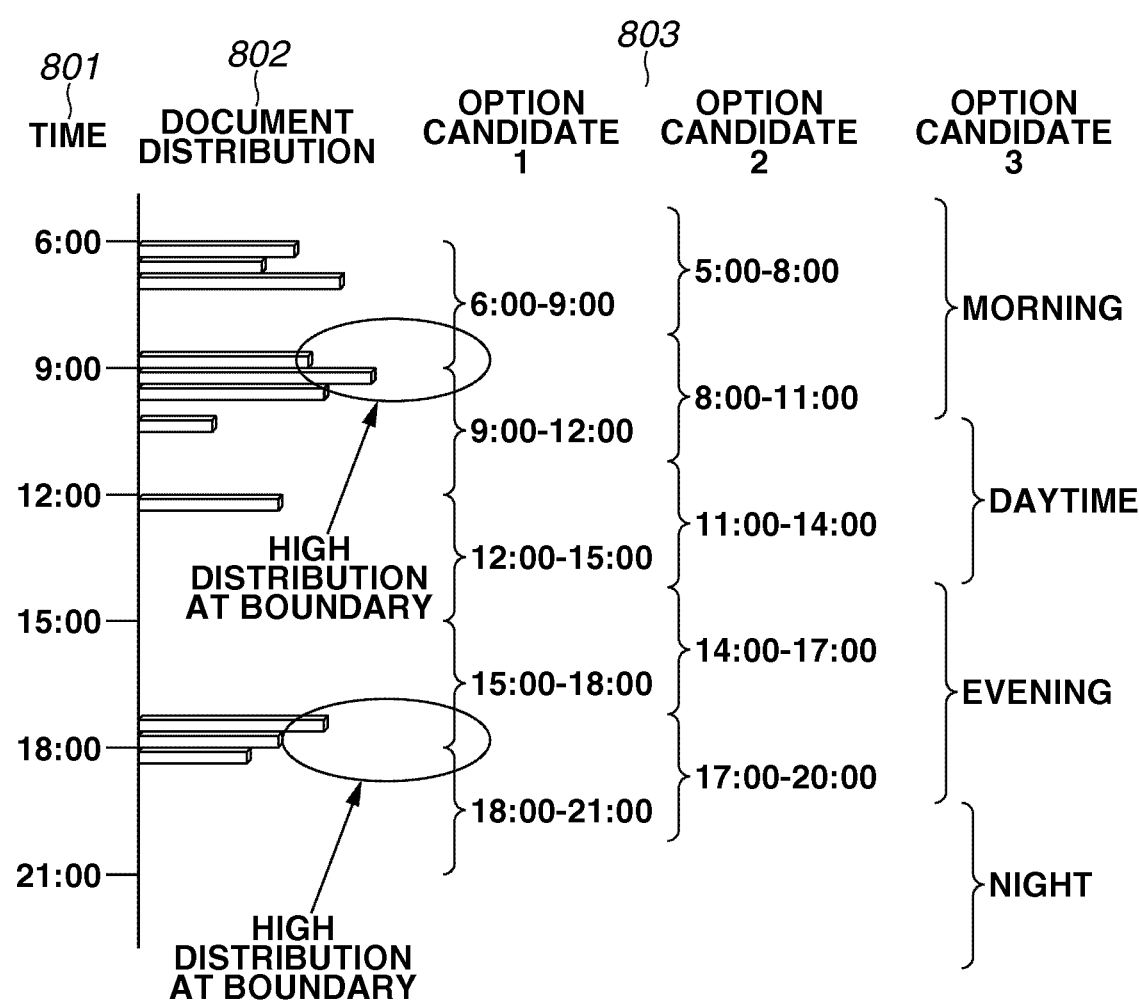
FIG. 8 illustrates an example of processing for determining an option in step S602 in FIG. 6.
Figure 9:
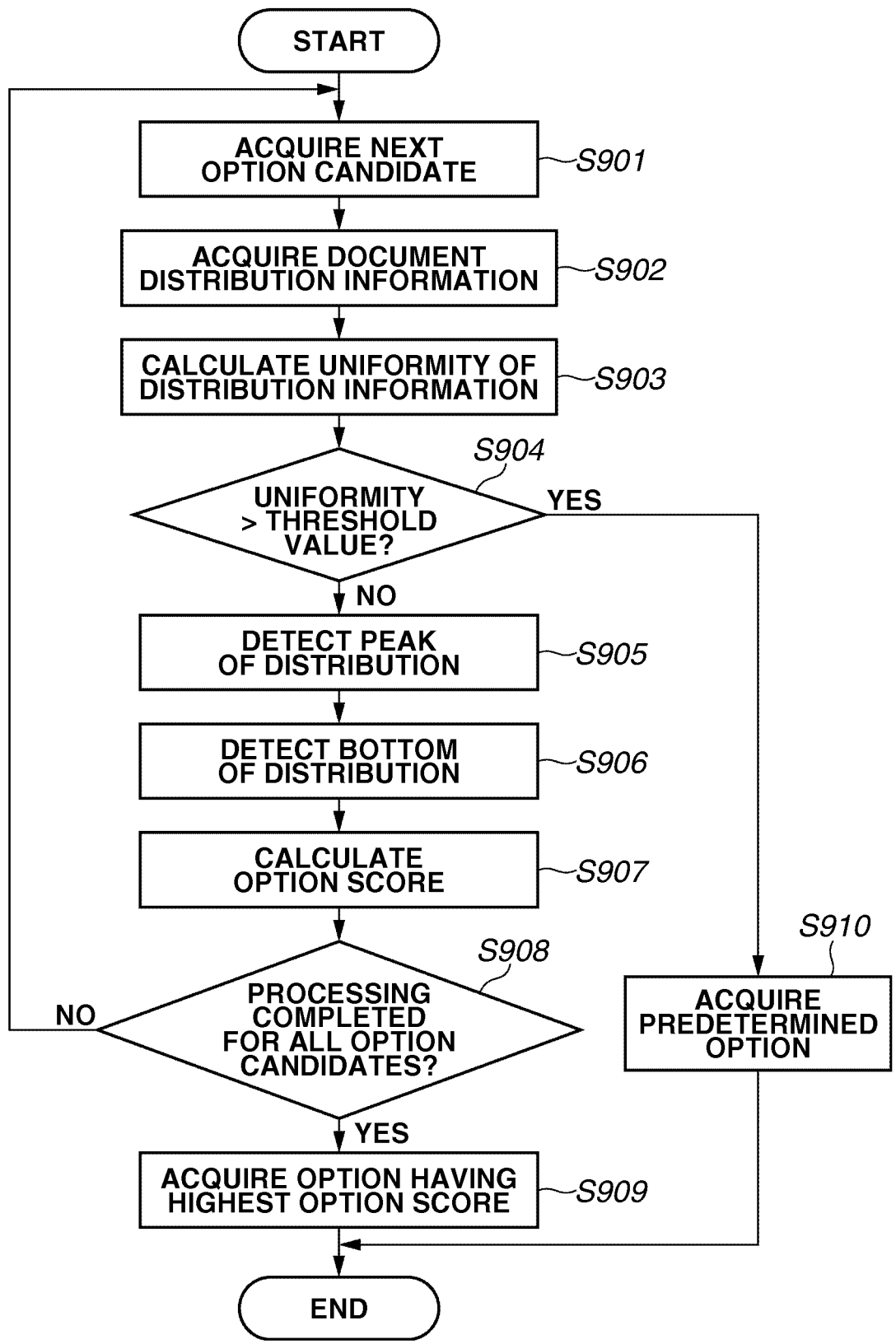
FIG. 9 is a flow chart illustrating exemplary processing performed when a user selects an attribute selection area 2004 in FIG. 2.

FIG. 9 is a flow chart illustrating the processing described in FIG. 8.

In step S901, the CPU 11 acquires one of a plurality of option candidates for a certain attribute. In step S902, the CPU 11 creates a histogram for the number of contents corresponding to time denoted by the attribute "Photographing date." In step S903, the CPU 11 calculates the uniformity of distribution information (uniformity information). FIG. 10 illustrates an example of uniformity calculation. The uniformity S is represented by a reciprocal of variance (distribution). This means that the larger the uniformity S, the smaller becomes deviation from an average value of the content distributions.

In step S904, the CPU 11 determines whether the uniformity is larger than a threshold value. When the uniformity is larger than the threshold value (YES in step S904), the distribution is assumed to have no distinct peaks and valleys and therefore the CPU 11 does not calculate an option score based on peaks or valleys. The CPU 11 advances the processing to step S910 to acquire options based on a predetermined order. On the other hand, when the uniformity is not larger than the threshold value (NO in step S904), the CPU 11 advances the processing to step S905.

In step S905, the CPU 11 detects peak information of the distribution, for example, by differentiating the distribution histogram to obtain a local maximum value. In step S906, the CPU 11 detects bottom information of the distribution, for example, by differentiating the distribution histogram to obtain a local minimum value. In step S907, the CPU 11 calculates the option score indicating the suitability as an option to be displayed for the attribute.

Figure 11:
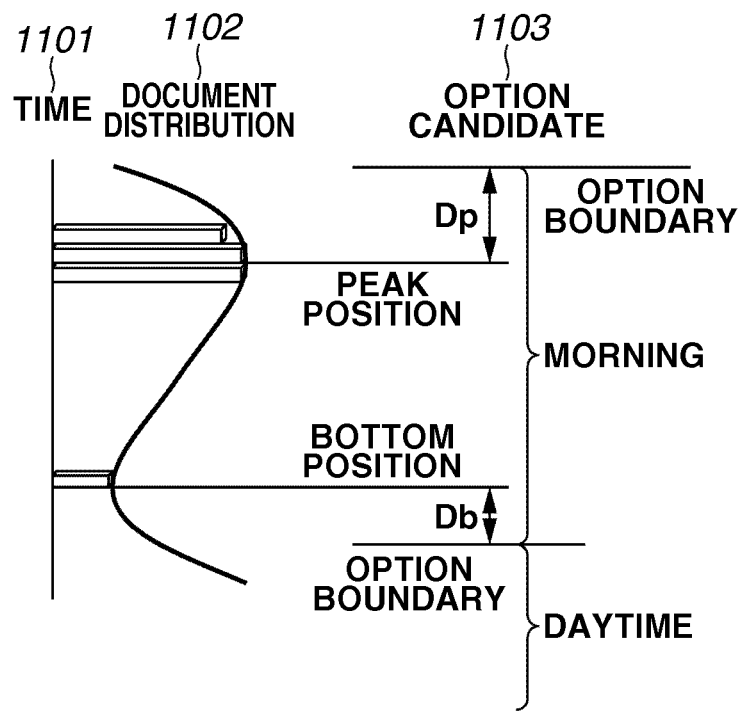
FIG. 11 illustrates an example of option score calculation.

FIG. 11 illustrates an example of option score calculation. A time axis 1101 denotes the clock time of one day similarly to time 801 in FIG. 8. A document distribution 1102 corresponds to the document distribution 802 in FIG. 8 which is the distribution information about the retrieval target contents mapped on the time axis assigned the attribute "Photographing date." An option candidate 1103 denotes an option "Morning." As illustrated in FIG. 11, the CPU 11 obtains a distance Dp between a peak position of the content distribution and an option boundary closest to the peak position, and a distance Db between a bottom position of the content distribution and an option boundary closest to the bottom position. When a plurality of peaks or bottoms exist, the CPU 11 calculates the option score using such an index that increases with increasing Dp and decreasing Db with respect to all of the peaks and bottoms.

In the present exemplary embodiment, although the CPU 11 makes comparison between the peak value of the distribution and boundary values of the option candidates and between the bottom value of the distribution and boundary values of the option candidates, it is also possible to make comparison between the peak or bottom value of the distribution and the median value of options. Further, a combination of these reference values may be used.

In step S908, the CPU 11 determines whether the processing is completed for all option candidates. When the processing is completed for all option candidates (YES in S908), the CPU 11 advances the processing to the following step S909. On the other hand, when the processing is not completed for any option candidate (NO in S908), the CPU 11 returns the processing to step S901 and calculates the option score for the next option candidate. In step S909, the CPU 11 acquires an option which has the highest option score and determines the option as an option to be displayed for the attribute.

Thus, it becomes possible to display options suitable for a set of the retrieval target contents for a certain attribute.

Figure 12:
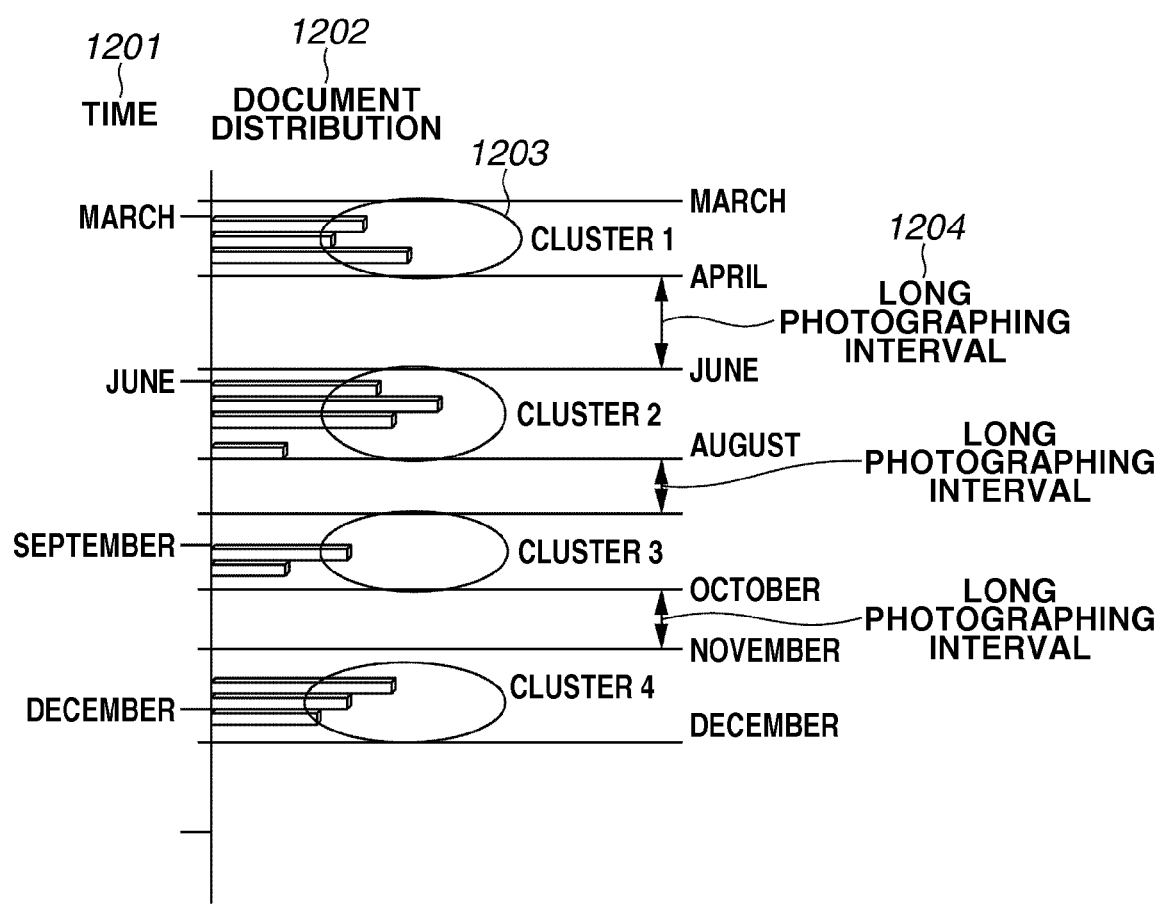
FIG. 12 illustrates an example of processing for determining an option in step S602 in FIG. 6.

FIG. 12 illustrates another exemplary embodiment of processing for determining an option in step S602 in FIG. 6 which is different from the one in FIG. 8. The present exemplary embodiment will be described using an example where an option is determined for the attribute "Photographing date." The CPU 11 dynamically determines a range of options to be displayed based on the document distribution included therein.

A time axis 1201 denotes the photographing date. A document distribution 1202 is a histogram for the number of contents for the attribute value "Photographing date." Clusters 1203 of content are displayed for one option. Portions which have a high density of histogram are handled as a cluster and displayed as an option. More specifically, a photographing interval is used to create an option cluster. First, the CPU 11 records all photographing intervals in the period and calculates an average interval. Then, the CPU 11 scans all photographing intervals, recognizes a photographing interval remarkably longer than the average interval, such as a photographing interval 1204, as delimitation of cluster, and assigns a label of photographing date interval to each cluster. Referring to FIG. 12, four options "March-April", "June-August", "September", and "November-December" are generated for the attribute "Photographing date."

Figure 13:
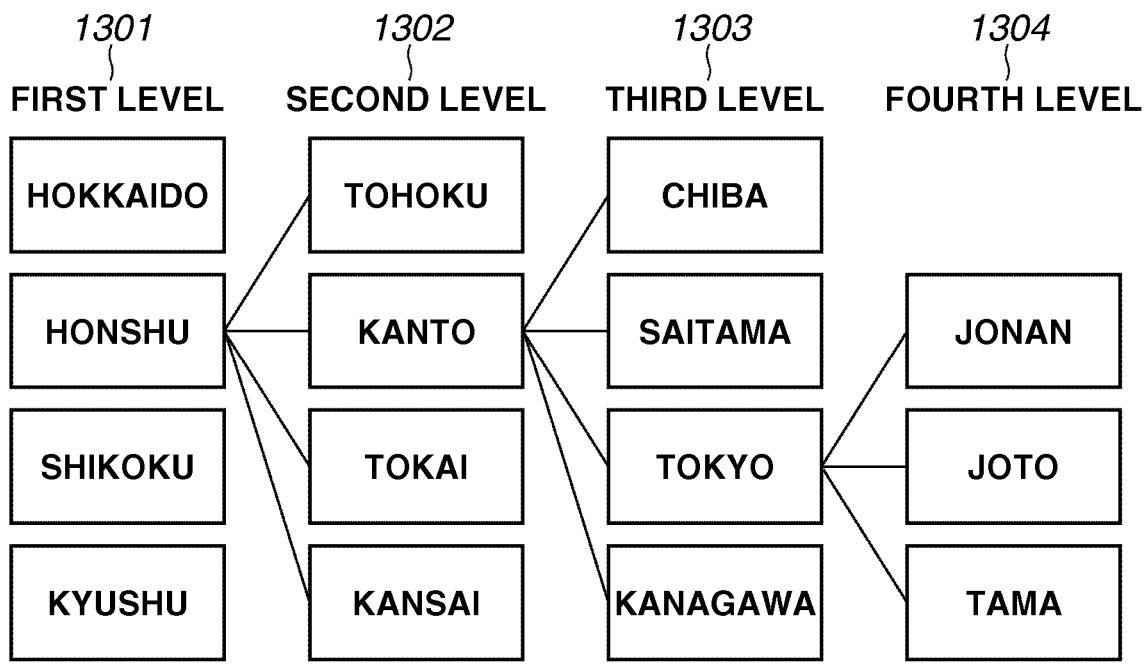
FIG. 13 illustrates an example of a hierarchical structure for attribute "Photographing location."

FIG. 13 illustrates an example using an attribute which has a hierarchical structure. In the example in FIG. 13, the CPU 11 determines options for the attribute "Photographing location." The hierarchical structure for denoting options indicating the photographing location includes a first level 1301 corresponds to islands such as "Hokkaido" and "Honshu", a second level 1302 corresponds to districts such as "Tohoku" and "Kanto" each including a plurality of prefectures, a third level 1303 corresponds to prefectures, and a fourth level 1304 corresponds to areas each including a plurality of wards. When ranges of options for an attribute which has such a hierarchical structure are determined, the CPU 11 also refers to the hieratical structure.

Figure 14:
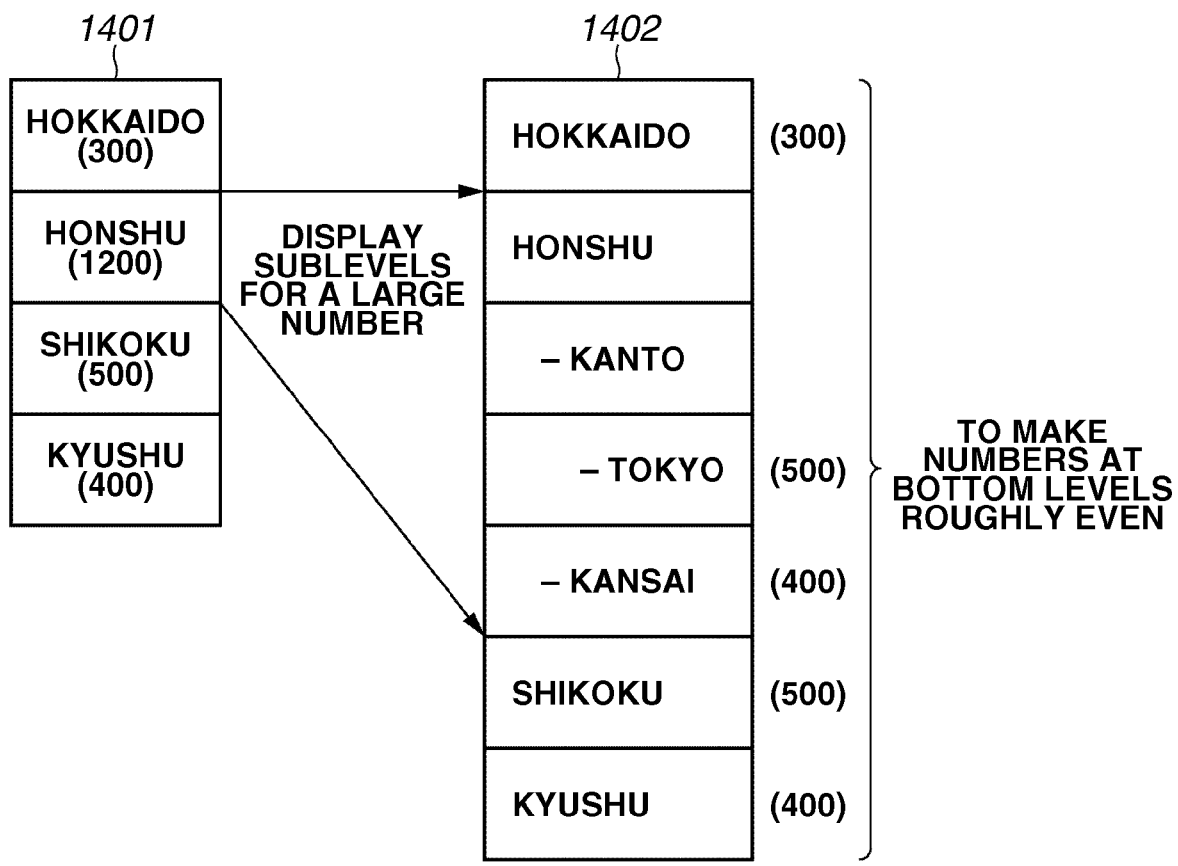
FIG. 14 illustrates an example display of options for attribute "Photographing location."

FIG. 14 illustrates an example of display of options which have the hierarchical structure illustrated in FIG. 13.

Referring to FIG. 14, the CPU 11 dynamically divides the option levels such that each option to be displayed includes a roughly equal number of contents, based on the content distribution included therein. A display portion 1401 denotes the first level in FIG. 13. Numbers enclosed in parentheses denote the number of contents included in each option. Since an option "Honshu" includes many contents, the CPU 11 divides it into a second level. An option is divided into a sub-level when the number of contents included therein is n (2 or more) times the average value of contents of other options except for itself. After division of "Honshu", an option "Kanto" is further divided into "Tokyo." The CPU 11 repeat this processing until each bottom level of options includes a roughly equal number of contents, as illustrated by a display portion 1402.

It is also possible to acquire the maximum number of options can be displayed in the option display area 2001 and then stop division when the maximum number is reached. Further, equal division may be attained using a balanced tree.

Figure 20:
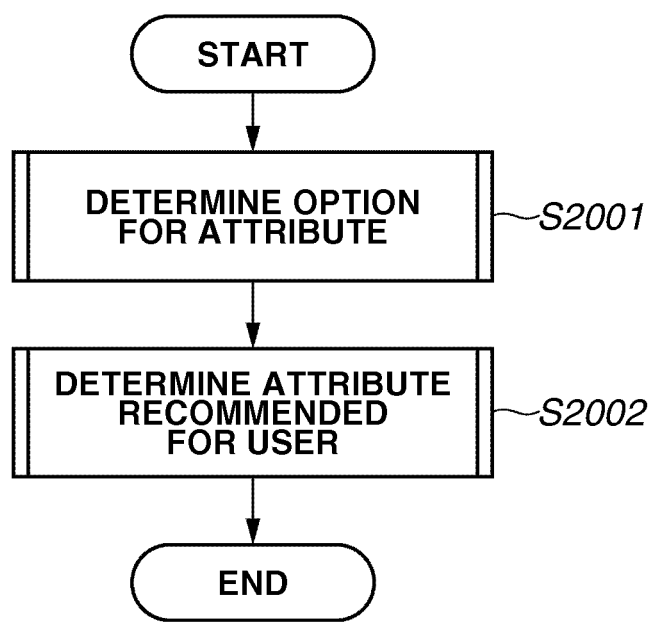
FIG. 20 is a flow chart illustrating processing for determining an option.

FIG. 20 illustrates processing for determining attribute classification according to another exemplary embodiment which is different from the one of FIGS. 6 and 7.

Referring to FIG. 20, from among a plurality of recommended attribute candidates, an attribute in which options have a roughly equal distribution of histogram for the number of contents is handled as a next recommended attribute. Accordingly, the refinement effect is guaranteed whatever option is selected from among the recommended options.

In step S2001, the CPU 11 determines options for all of the plurality of recommended attribute candidates. The processing illustrated in FIG. 9 is used to determine options.

In step S2002, the CPU 11 calculates a score of refinement effect for recommended attribute candidates based on the content distribution, and recommends an attribute which has the highest score of refinement effect. Step S2002 will be described in detail below with reference to FIGS. 21 to 23.

Figure 21:
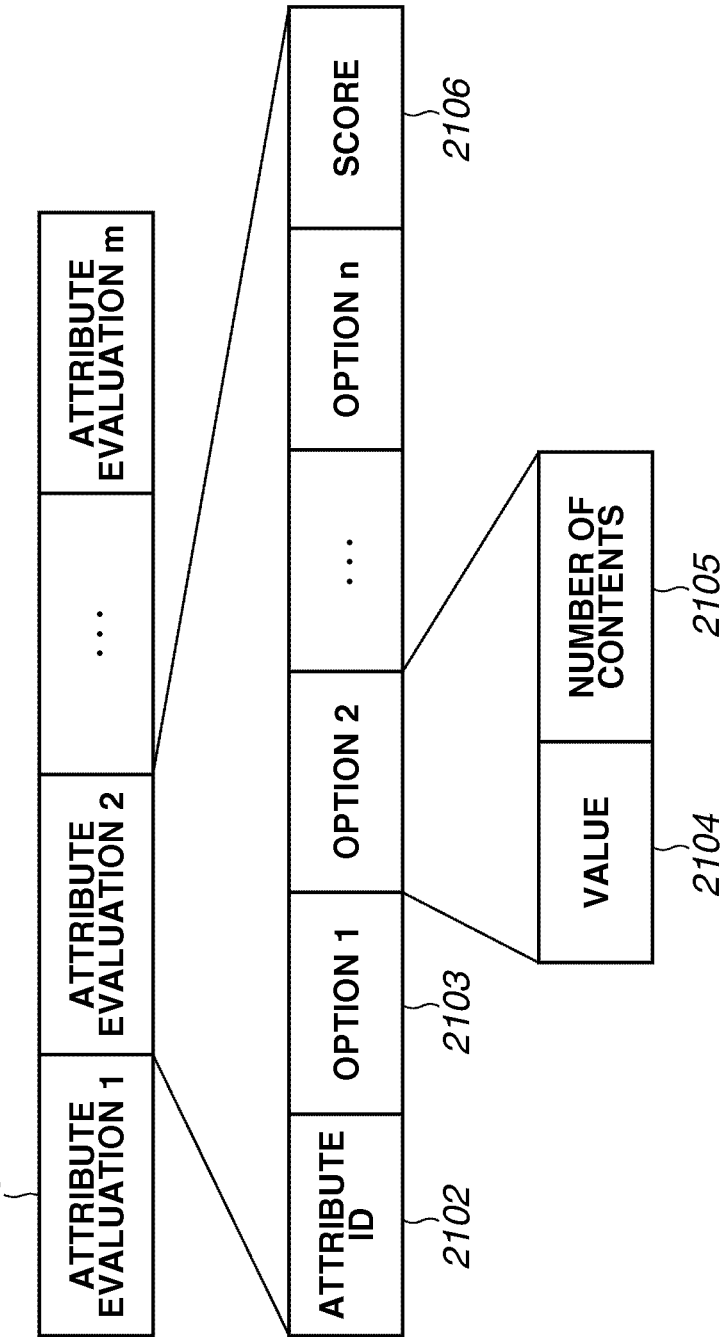
FIG. 21 illustrates an attribute evaluation table.

FIG. 21 illustrates a configuration of a score attribute evaluation table for calculating the score for measuring the refinement effect of recommended attribute candidates, and an example of attribute score calculation. The attribute evaluation table includes a series of a plurality of recommended attributes 2101. Each piece of attribute evaluation data includes an attribute ID 2102, a series of options 2103, and a score 2106. The attribute ID denotes information for identifying the attribute. Each option includes a value 2104, i.e., a character string label, and the number of contents 2105 having the value 2104. The number of contents 2105 stores the number of contents which satisfy "Attribute=Value" within a set of contents. The score 2106 denotes an attribute score. The uniformity in FIG. 10 is used as the score 2106.

Figure 22:
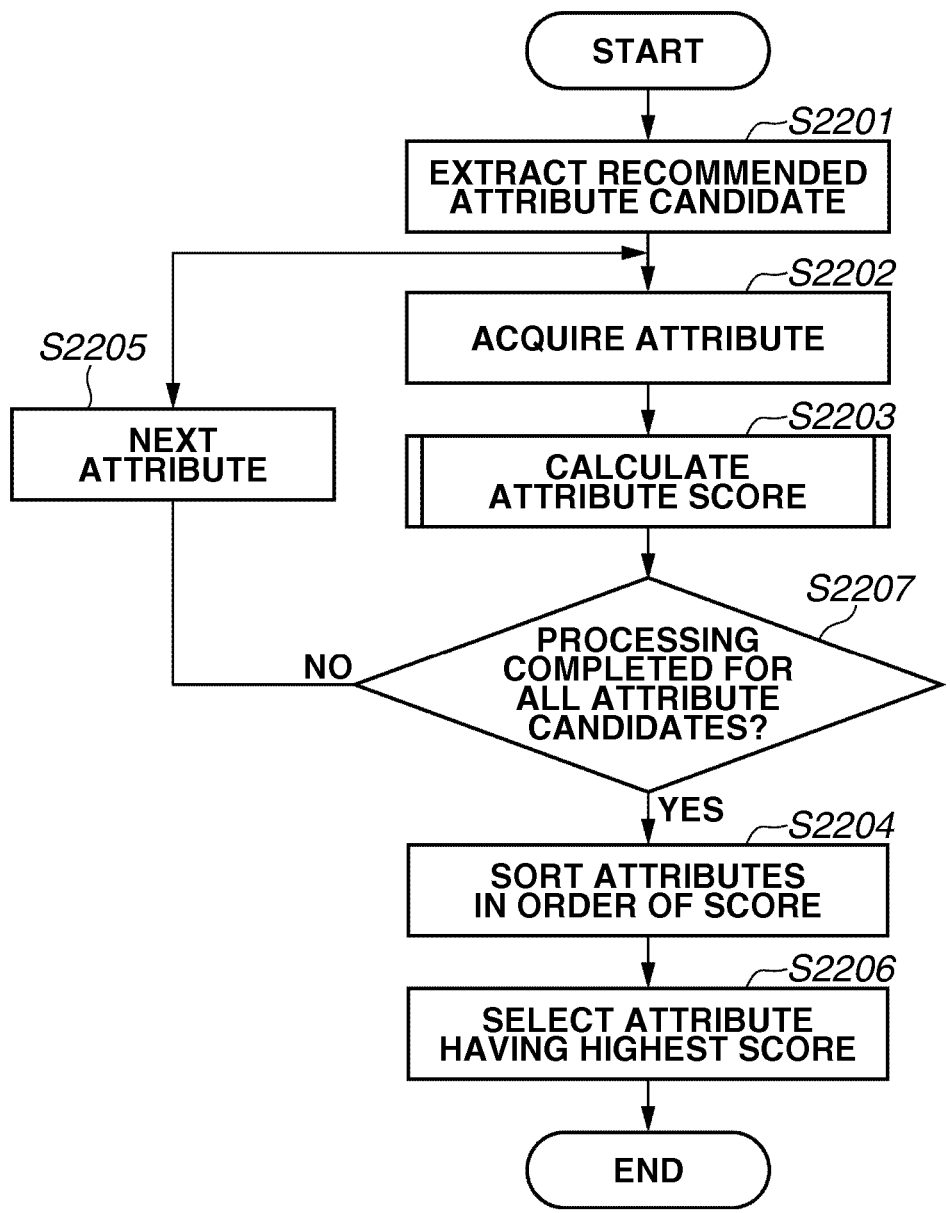
FIG. 22 is a flow chart illustrating processing for determining an attribute.

Processing for the attribute evaluation table in FIG. 21 will be described with reference to the flow chart in FIG. 22.

In step S2201, the CPU 11 extracts attribute candidates from the attribute evaluation table. In step S2202, the CPU 11 acquires one attribute from the extracted attribute candidates. In step S2203, the CPU 11 calculates the attribute score as described in detail below with reference to FIG. 23. Then in step S2207, the CPU 11 determines whether the processing is completed for all attribute candidates. When the processing is not completed (NO in step S2207), the CPU 11 advances the processing to step S2205 to acquire the next attribute. When the processing is completed (YES in step S2207), the CPU 11 advances the processing to step S2204 to sort the attributes in order of attribute score. In step S2206, the CPU 11 selects an attribute which has the highest attribute score.

FIG. 23 is a flow chart illustrating detailed processing for calculating the attribute score of step S2203. In step S2301, the CPU 11 lists the options determined in step S2001 as option candidates. In step S2302, the CPU 11 acquires one option from the option candidates. In step S2303, the CPU 11 obtains the number of contents which satisfy "Attribute=Value" within a set of specified contents. In step S2304, the CPU 11 sets the obtained option and the number of contents in respective fields in the attribute evaluation table. In step S2306, the CPU 11 checks whether the processing is completed for all option candidates. When the processing is not completed for all option candidates (NO in step S2306), the CPU 11 selects the next option in step S2305 and returns to step S2302. When the processing is completed for all option candidates (YES in step S2306), the CPU 11 advances the processing to step S2307. In step S2307, the CPU 11 calculates the attribute score based on the formula for calculating the uniformity in FIG. 10, and stores the attribute score in the attribute evaluation table.

Therefore, attributes in which each option includes a roughly equal number of contents and which have high refinement effect can be recommended to the user.

Figure 16:
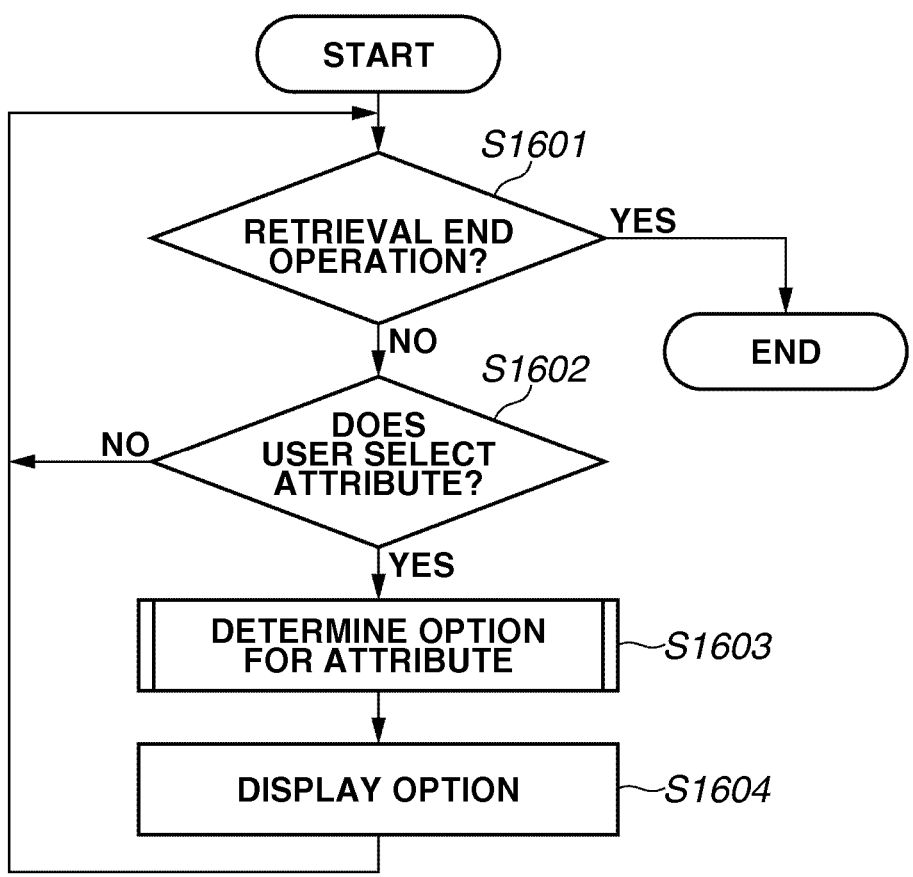
FIG. 16 is a flow chart illustrating processing for determining an option.

FIG. 16 is a flow chart illustrating an example of processing performed when a user selects an attribute classification from the attribute selection area 2004 in FIG. 2. When the user selects a desired attribute from the attribute selection area 2004, the selected attribute and options thereof are rasterized and displayed in the option display area 2001.

In step S1601, the CPU 11 checks whether the user has performed the retrieval end operation. When the user has performed the retrieval end operation (YES in step S1601), the CPU 11 terminates retrieval illustrated in FIG. 16.

On the other hand, when the user has not performed the retrieval end operation (NO in step S1601), the CPU advances the processing to step S1602 to determine whether the user has selected an attribute via the retrieval screen 200. When the CPU 11 determines that a selection event has occurred (YES in S1602), it determines an option for the attribute. On the other hand, when the CPU 11 determines that a selection event has not occurred (NO in step S1602), the CPU 11 returns the processing to step S1601. The selection event is such an event that occurs when selection of the attribute by the user is detected.

In step S1603, the CPU 11 performs processing for determining options to be displayed for the selected attribute. The processing in step S1603 is similar to that of the flow chart in FIG. 9. In step S1604, the CPU 11 displays the attribute selected in step S1602 and options determined in step S1603 in the option display area 2001. When step S1604 is completed, the CPU 11 returns to step S1601 to wait for a new event.

Figure 17:
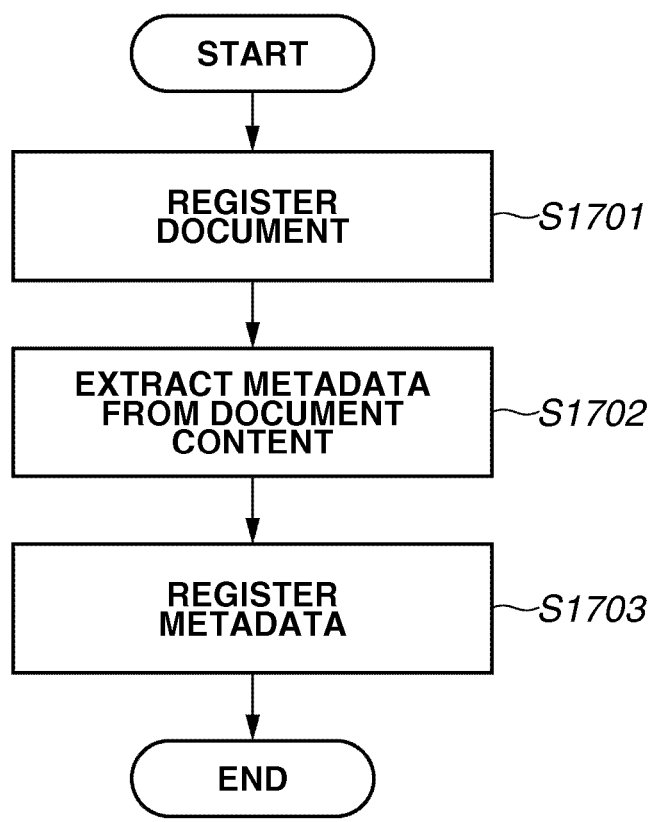
FIG. 17 is a flow chart illustrating processing for registering metadata.

FIG. 17 illustrates processing performed by the information processing apparatus 100 to supply metadata to a content and register it in the database.

In step S1701, the CPU 11 registers the content in the database. In step S1702, the CPU 11 analyzes the content and extracts its content information. In step S1703, the CPU 11 registers in the database the metadata originally supplied to the content and the content information extracted in step S1702 as metadata.

FIG. 18 illustrates an example of a contents database table which constitutes the database. In the present exemplary embodiment, images captured by a digital camera are stored as contents.

A content ID field 1801 stores an ID for locating the content. A field 1802 stores the photographing date of the content (image). The photographing date is automatically supplied when an image is captured by the digital camera. A field 1803 stores the photographing location. Latitude/longitude information acquired from GPS information mounted on the camera and location name acquired from map information are stored in the field 1803. A field 1804 stores information about persons included in each image. The CPU 11 extracts personal areas from the image in step S1702 in FIG. 17, performs face recognition matching using personal information which is registered in advance, and extracts personal information as an example of the content information.

These pieces of information are stored in a relational database and the CPU 11 can promptly obtain the number of contents that satisfy a search condition based on the attribute.

Figure 19:
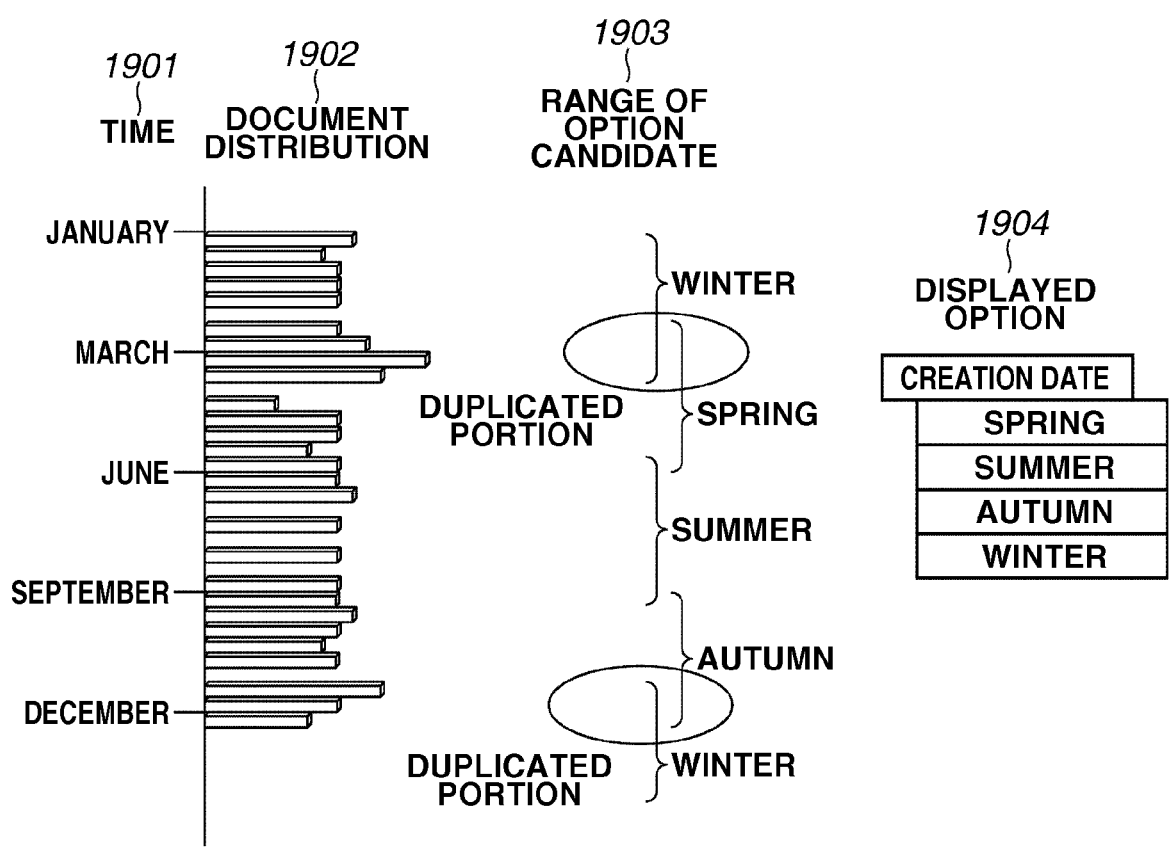
FIG. 19 illustrates an example display of options.

For attribute classifications which have a continuous attribute value, such as date, it may be possible to partially overlap ranges of attribute values for options as illustrated in FIG. 19.

Although the above exemplary embodiment has specifically been described using an image captured by a digital camera as an example of contents, the contents may be a document file. In the case of a document file, metadata that includes attribute classifications such as a keyword, file creation date, update date, creator, etc can be used for retrieval. Further in the case of a document file, metadata may be supplied automatically by a system or manually by a user.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-105496 filed Apr. 23, 2009, which is hereby incorporated by reference herein in its entirety.

What is claimed is:

1. An information processing apparatus which retrieves a target content from a storage apparatus storing a plurality of contents, the information processing apparatus comprising:
   an acquisition unit configured to acquire content distribution information with respect to a criterion denoted by an attribute value of metadata supplied to the content, wherein the content distribution information includes peaks where a distribution of the plurality of contents is greatest;
   a determination unit configured to determine one or more candidates of a search condition, among a plurality of search conditions that divide the criterion denoted by the attribute value of metadata that was divided so that boundaries were different respectively, based on the distribution information, wherein the one or more candidates of the search condition has boundaries not overlapping with any peak of the content distribution information;

a display unit configured to display a screen which includes the attribute value and the one or more candidates of the search condition, as an option of a plurality of options, determined by the determination unit; and a retrieval unit configured to retrieve content from the plurality of options based on the search condition corresponding to the option of the plurality of options selected by a user.

2. The information processing apparatus according to claim 1, wherein the display unit is configured to display the content retrieved by the retrieval unit.

3. The information processing apparatus according to claim 1, wherein the determination unit determines a candidate of the search condition which divides the criterion denoted by the attribute into a plurality of criteria so that each of the plurality of options includes an even content distribution.

4. The information processing apparatus according to claim 1, wherein the determination unit determines a candidate of the search condition by dividing the criterion denoted by the attribute value into a plurality of criteria so that a boundary of the attribute value denoted by the option does not overlap with any peak of a plurality of content distributions in the criterion, based on the distribution information.

5. The information processing apparatus according to claim 1, wherein the determination unit determines a candidate of the search condition by dividing the criterion denoted by the attribute into a plurality of criteria so that a boundary of the attribute value denoted by the option overlaps with any valley of a plurality of content distributions in the criterion, based on the distribution information.

6. The information processing apparatus according to claim 4, wherein the determination unit is configured to determine a plurality of candidates of a search condition to be added as a query related to the attribute value, based on the distribution information; and wherein the determination unit determines a candidate of the search condition by integrating the plurality of candidates by a peak of the content distribution so that the boundary of the attribute value denoted by the option does not overlap with any peak of the plurality of content distributions.

7. The information processing apparatus according to claim 1, wherein the attribute value comprises one of a time period and season related to the content.

8. The information processing apparatus according to claim 1, wherein the attribute value comprises a location related to the content.

9. The information processing apparatus according to claim 1, wherein each of the plurality of contents is supplied with metadata related to a plurality of attributes, and the determination unit determines the attribute to be used as the option from among the plurality of attributes.

10. A method for controlling an information processing apparatus which retrieves a target content from a storage apparatus storing a plurality of contents, the method comprising:

acquiring content distribution information with respect to a criterion denoted by an attribute value of metadata supplied to a content, wherein the content distribution information includes peaks where a distribution of the plurality of contents is greatest;

determining one or more candidates of a search condition, among a plurality of search conditions that divide the criterion denoted by the attribute value of metadata that was divided so that boundaries were different respectively, based on the distribution information, wherein the one or more candidates of the search condition has boundaries not overlapping with any peak of the content distribution information;

displaying a screen including the attribute value and the one or more candidates of the search condition, as an option of a plurality of options; and retrieving content from the plurality of options based on the search condition corresponding to an option of the option of the plurality of options selected by a user.

11. A non-transitory computer-readable storage media storing a program causing a computer to serve as an information processing apparatus which retrieves a target content from a storage apparatus storing a plurality of contents, the computer-executable instructions causing the computer to perform a method comprising:

acquiring content distribution information with respect to a criterion denoted by an attribute value of metadata supplied to a content, wherein the content distribution information includes peaks where a distribution of the plurality of contents is greatest;

determining one or more candidates of a search condition, among a plurality of search conditions that divide the criterion denoted by the attribute value of metadata that was divided so that boundaries were different respectively, based on the distribution information, wherein the one or more candidates of the search condition has boundaries not overlapping with any peak of the content distribution information;

displaying a screen including the attribute value and the one or more candidates of the search condition, as an option of a plurality of options; and retrieving content from the plurality of options based on the search condition corresponding to an option of the option of the plurality of options selected by a user.

* * * * *